United States Patent [19]

Millard et al.

[11] 3,911,597

[45] Oct. 14, 1975

[54] SYNTHETIC TERRAIN GENERATOR

[75] Inventors: Maurice Millard; John R. Trzeciak; Brian J. Woycechowsky, all of Binghamton, N.Y.

[73] Assignee: The Singer Company, New York, N.Y.

[22] Filed: Oct. 18, 1972

[21] Appl. No.: 298,586

Related U.S. Application Data

[63] Continuation-in-part of Ser. No. 108,447, Jan. 21, 1971, abandoned.

[52] U.S. Cl. ............................ 35/12 N; 178/DIG. 35
[51] Int. Cl.$^2$ ............................................ G09B 9/08
[58] Field of Search ............ 35/10.2, 11, 12 N, 9 R, 35/9 A, 8 R; 178/6.8, DIG. 35; 235/150.2; 340/27 NA

[56] References Cited
UNITED STATES PATENTS

| | | | |
|---|---|---|---|
| 3,060,596 | 10/1962 | Tucker et al. | 35/10.2 |
| 3,098,929 | 7/1963 | Kirchner | 235/150.2 X |
| 3,418,459 | 12/1968 | Purdy et al. | 340/27 NA X |
| 3,439,105 | 4/1969 | Ebeling et al. | 35/10.2 X |
| 3,520,994 | 7/1970 | McAfee et al. | 35/10.2 X |
| 3,605,083 | 9/1971 | Kramer | 340/27 NA |
| 3,643,258 | 2/1972 | Balding | 340/27 NA X |

*Primary Examiner*—Robert W. Michell
*Assistant Examiner*—Vance Y. Hum
*Attorney, Agent, or Firm*—Jeffrey Rothenberg; James C. Kesterson

[57] ABSTRACT

In one aspect of the invention, the simulation of the view of the terrain from an aircraft is provided on a raster swept CRT display by the generation thereon of a grid pattern comprised of two intersecting groups of grid lines. The line of sight from an eyepoint through the screen of the display to the synthetic terrain is represented by earth direction cosine voltages. When the values of the earth direction cosine voltages are in accordance with a predetermined relationship e.g. either one of a pair of null relationships, a video signal is generated thereby providing the grid pattern in a desired perspective. In another aspect of the invention, a view of the sky and the horizon is provided at selected locations on the screen. In response to the intersection of the line of sight with points representative of the sky, a first selected shade of grey is provided at the intersected point on the screen. In response to the intersection of the line of sight with points representative of the horizon, a second selected shade of grey is provided at the intersected point on the screen.

14 Claims, 12 Drawing Figures

SYNTHETIC TERRAIN GENERATOR

The invention herein described was made in the course of or under a contract, or subcontract thereunder, with the Department of the Navy.

This is a continuation-in-part of the application having Ser. No. 108,447 filed on Jan. 21, 1971, now abandoned.

BACKGROUND OF THE INVENTION

Field of the Invention

This invention relates to a display upon a viewing surface and more particularly to a display of a generated image simulating the view of the terrain, the sky and the horizon from an aircraft.

Description of the Prior Art

A typical aircraft simulator duplicates the cockpit of an actual aircraft, including the controls therein. In response to the operation of the controls, input signals are provided to a computer which provides signals to instruments in the duplicated cockpit.

Many simulators additionally include a visual display system comprising a cathode ray tube (CRT) whereon the view of the terrain from the aircraft is simulated.

Of the two types of visual display systems typically used in aircraft simulation, one is referred to as a film based system and the other is referred to as a camera model system. In the film based system the image on a film is projected onto the display. In the camera model system a TV camera and an optical probe are positioned over a model of simulated terrain. In both of the systems, the beam of the CRT successively traces an array of equally spaced horizontal lines across the screen thereof (525 to 2000 lines are typical). Each horizontal line is initiated in response to a horizontal sync pulse. Additionally, a vertical sync pulse is provided to identify the horizontal line traced closest to the top of the screen. The array of lines is known in the art as a raster and the beam which traces the array of lines is known as the "raster beam". An image is formed on the screen by selectively displaying portions of the raster lines at selected shades of grey.

Flight simulators are used to avoid the risk of losing an expensive aircraft due to an error by an inexperienced student pilot, avoid the risk of injury to the student pilot that may occur due to an error, provide a simulation of failures in the airplane and instruments of the aircraft and because the cost of operating a simulator is less than the cost of operating an aircraft. Therefore, the commercial success of a simulator with a visual system therein is related to the cost of the visual system. Since the film based and the camera model systems are costly, a need exists for visual systems having a reduced cost.

SUMMARY OF THE INVENTION

The principal object of the present invention is to provide a simulation of the view of the terrain from an aircraft.

Another object of the present invention is to provide a simulation of the view of the terrain and the sky from an aircraft.

Still another object of the present invention is to provide a simulation of the terrain, the sky and the horizon from an aircraft.

According to the present invention, signals representative of the deflection of a beam on a viewing surface are provided to an aircraft direction cosine generator for generating aircraft direction cosine signals indicative of the line of sight from an eyepoint in a simulated aircraft to the location of the beam on the viewing surface; transformation apparatus, responsive to the aircraft direction cosine signals, generates earth direction cosine signals indicative of the line of sight in an earth coordinate system; a video pulse is generated in concurrent response to said earth direction cosine signals, a signal representative of the altitude of said eyepoint above a synthetic terrain and signals representative of the simulated velocity of the aircraft said video pulse being representative of the line of sight intersecting the grid line on a synthetic terrain; a sky signal is generated by a comparator in response to a selected portion of said altitude signal being greater or equal to one of said earth direction cosine signals; a horizon signal is generated by a dual comparator in response to one of said earth direction cosine signals being intermediate to a pair of selected portions of said altitude signal.

Apparatus in accordance with the present inventin may be economically constructed for providing a simulated view of a terrain comprised of a grid pattern with the appearance of a sky and a horizon above the terrain.

The foregoing and other objects, features and advantages of the present invention will become more apparent in light of the following detailed description of the preferred embodiment thereof as illustrated in the accompanying drawing.

DESCRIPTION OF THE PREFERRED EMBODIMENT

In the present invention, a simulation of the view of terrain from a aircraft is provided by two intersecting groups of grid lines displayed viewing surface, such as the screen of a CRT. The grid display is called a view of a synthetic terrain. The grid lines form a perspective view of squares which may be alternately darkened and brightened to provide a checkerboard appearance to improve the simulation.

Figure 1:
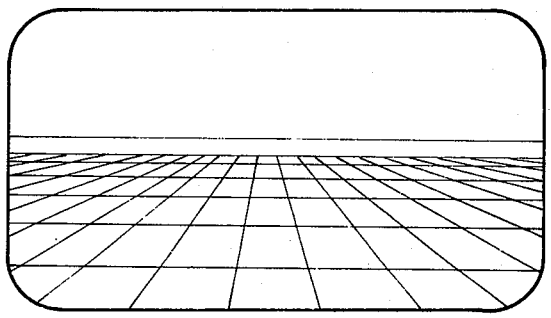
FIG. 1 is a view which is displayed in response to the simulation of an aircraft which is flying straight, level and parallel to one group of the grid lines of a synthetic terrain.
Figure 2:
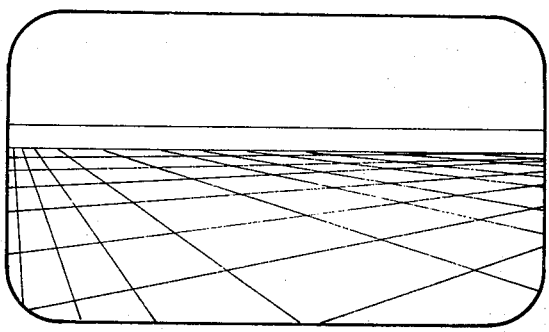
FIG. 2 is a view which is displayed in response to the simulation of an aircraft which is yawed with respect to the synthetic terrain.
Figure 3:
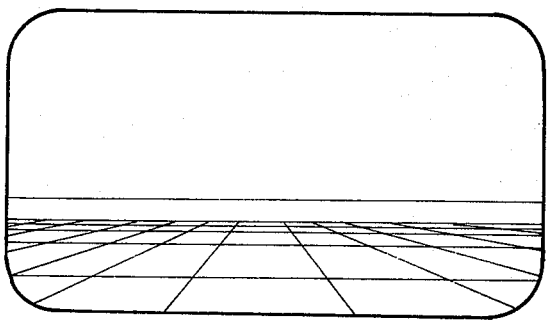
FIG. 3 is an illustration of the view of the synthetic terrain which is displayed in response to the simulation of an aircraft which is pitched up.

Referring now to FIG. 1, illustrated therein is the grid display provided in response to the simulation of an aircraft which is flying straight, level, and parallel to one group of the grid lines. FIGS. 2 and 3 are illustrative of the grid displays provided in response to the respective simulations of an aircraft being yawed and pitched up.

Figure 4:
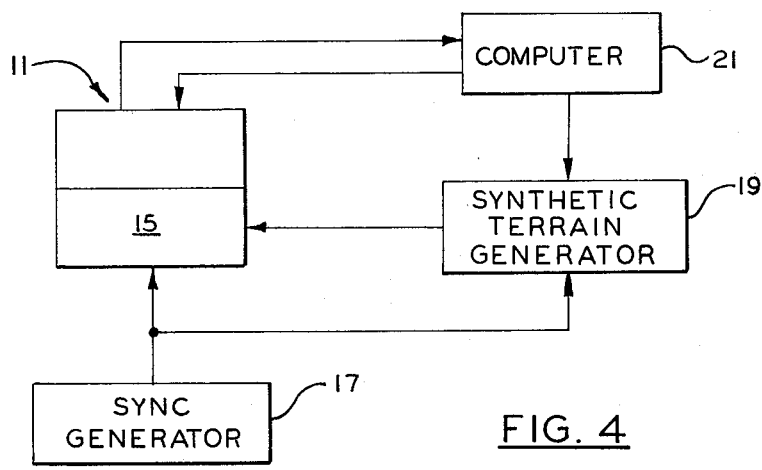
FIG. 4 is a block diagram of a synthetic terrain generator in a display system.

Referring now to FIG. 4, a simulator 11 includes a display unit 15 wherein the screen of a CRT is swept by a raster. Raster swept CRTs are well known in the art. A sync generator 17 provides horizontal and vertical sync signals to the display 15 for the generation of the raster. The video input to the display 15 is provided by a synthetic terrain generator 19 which is connected to a computer 21 and to the sync generator 17. The computer 21 is also connected to the simulator 11 to provide excitation for the instruments therein and to receive control signals therefrom.

In one aspect of the present invention, in response to signals representative of a line of sight from an eyepoint in the aircraft through the screen to the terrain whereon the line of sight intersects a grid line, a video pulse is provided to the display 15 by the synthetic terrain generator 19. In this embodiment, the CRT is biased below cutoff (referred to as a blanked CRT). In response to the video signal the CRT is unblanked to cause a display of a point on the screen where the beam is located whereby a simulation of the view of the terrain is provided. In other embodiments the CRT may be alternatively blanked and unblanked in response to the video signal whereby the checkerboard appearance, referred to hereinbefore, may be provided.

In another aspect of the present invention, a sky signal and a horizon signal are provided by the synthetic terrain generator 19 to the display 15 in response to signals respectively representative of the intersection of the line of sight with the sky and the horizon.

In the synthetic terrain generator 19, a reference cosine generator generates voltages representative of a line of sight from an eyepoint to a point on the screen where the beam is located. In response to the voltages generated by the reference direction cosine generator and voltages representative of the roll, pitch and heading of the aircraft, an aircraft to earth coordinate transformation generator generates voltages representative of the line of sight in an earth coordinate system in the earth coordinate system the line of sight changes in accordance with the roll, pitch and heading of the aircraft. The voltages generated by the coordinate transformation generator, voltages representative of the height of the eyepoint above the synthetic terrain, and voltages representative of the simulated velocity of the aircraft are applied to a video generator. In response thereto, the video generator generates the video pulse referred to hereinbefore whenever the applied voltages are in accordance with one of a pair of null relationships.

Figure 5:
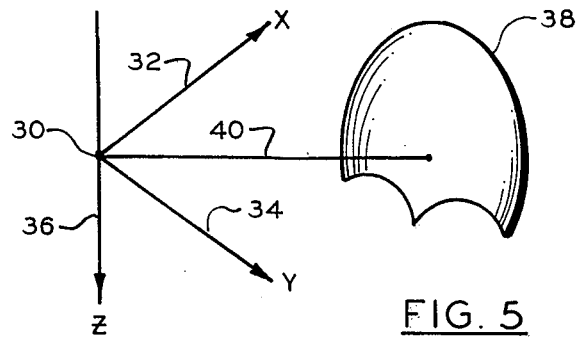
FIG. 5 is a perspective view of an eyepoint and the screen of a cathode ray tube.

In order to simplify the explanation of the reference direction cosine generator, provided hereinafter are relationships between an eyepoint and the screen of the CRT. Referring now to FIG. 5, an eyepoint 30 is the origin of a first coordinate system having axes 32 (X), 34 (Y), 36 (Z). In this embodiment, the axes 32 (X), 34 (Y), 36 (Z) respectively correspond to axes related to the airframe of the simulated aircraft. The eyepoint 30 is the center of curvature of a spherical screen 38 where the radius of the sphere is of unit length. A line of sight 40 (a radius of unit length) extends from a point on the screen 38 to the eyepoint 30. It should be understood that the spherical screen 38 is only exemplary; the present invention relates to a viewing surface of any desired configuration.

Figure 6:
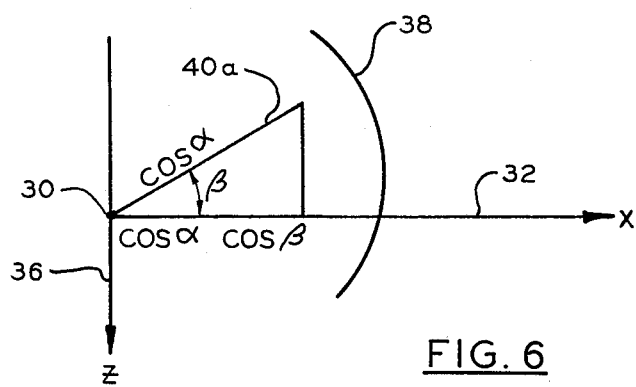
FIG. 6 is the view of FIG. 5 in the plane of the XZ axes thereof.

Referring now to FIG. 6, the line 40 (FIG. 5) is projected in the plane which includes the axes 32 (X), 36 (Z). In the X Z plane the length of a line projection 40a of the line 40 is in accordance with a relationship given as:

$P_{xz} = \cos \alpha$ where $\alpha$ is the angle between the X Z plane and the line 40; and $P_{xz}$ is the length of the line 40a.

The projection of the line 40 (and the line 40a) upon the axis 32 (X) is in accordance with a first direction cosine relationship given as:

$I_{b1} = \cos \beta \cos \alpha$ where $\beta$ is the angle between the line 40a and the axis 32 (X); and $I_{b1}$ is the length of the projection of the line 40 upon the axis 32 (X).

The projection of the line 40 upon the axis 32 (Y) is given as:

$I_{b2} = \sin \beta$ where $I_{b2}$ is the length of the projection of the line 40 upon the axis 34 (Y).

Referring to FIG. 6, the projection of the line 40a (and the line 40) upon the axis 36 (Z) is in accordance with a third direction cosine relationship given as:

$I_{b3} = \sin \beta \cos \alpha$ where $I_{b3}$ is the length of the projection of the line 40 upon the axis 36 (Z).

$I_{b1}$, $I_{b2}$ and $I_{b3}$ are respectively referred to as first, second and third direction cosines and collectively referred to as aircraft direction cosines. The values of the aircraft direction cosines may be used to designate any line of sight with respect to the simulated aircraft. When the aircraft direction cosines of a line of sight are known, the direction cosines of the line of sight in a second coordinate system (having axes rotated with respect to the axes 32 (X), 34 (Y), 36 (Z) are found by a well-known mathematical operation referred to as a linear transformation.

Figure 7:
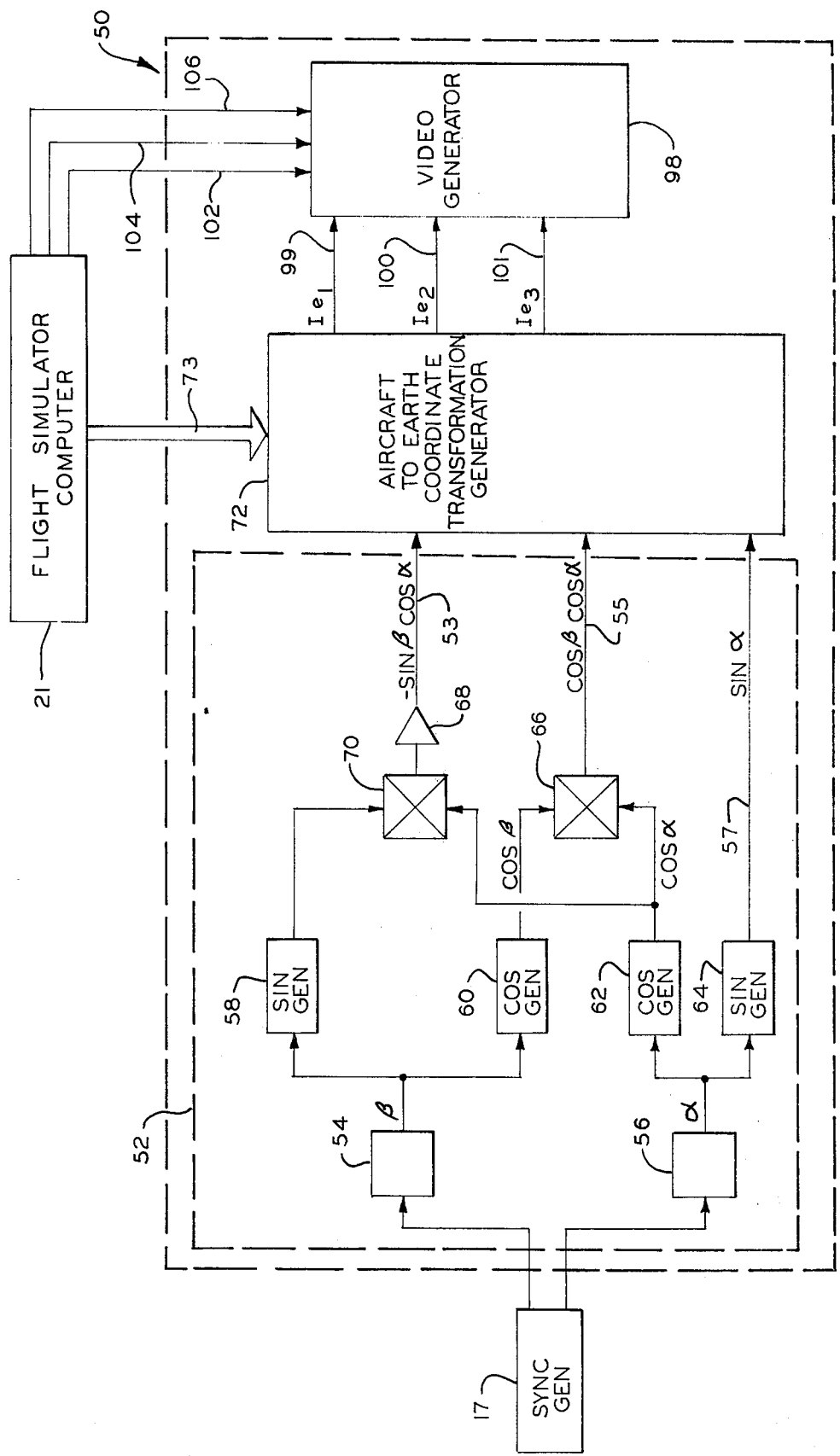
FIG. 7 is a block diagram of the preferred embodiment of the present invention.

Referring now to FIG. 7, a synthetic terrain generator 50 includes a reference direction cosine generator 52 which generates voltages proportional to the aircraft direction cosines. The generator 52 includes a pair of sweep voltage generators 54, 56 which have inputs respectively connected to the sync generator 17. Vertical and horizontal sync pulses are provided to the generators 54, 56, respectively, by the sync generator 17. In response to the sync pulses, the generators 54, 56 respectively provide horizontal and vertical sweep voltages at the vertical and horizontal sync frequencies. In this embodiment, the deflection of the beam of the CRT is in proportion to deflection voltages which are provided in response to the sync pulses; the sweep voltages are proportional to the deflection voltages. Additionally, the sweep voltages are zero when the beam is at the center of the screen. Accordingly, the horizontal and vertical sweep voltages are respectively proportional to the angles, $\alpha$ and $\beta$, referred to hereinbefore.

The output of the generator 54 is connected to the input of a sine generator 58 and the input of a cosine generator 60. The sine generator 58 and the cosine generator 60 provide voltages respectively proportional to the sine and the cosine of the angle ($\beta$) represented by the voltage provided by the generator 54.

The generator 56 is connected to the input of a cosine generator 62 and the input of a sine generator 64 which are similar to the cosine generator 60 and the sine generator 58, respectively. Therefore, the generator 64 provides a second aircraft direction cosine voltage proportional to the second direction cosine (sin $\alpha$). The output of the cosine generator 60 and the output of the cosine generator 62 are respectively connected to inputs of a multiplier circuit 66 which provides a voltage proportional to the product of the values of its input voltages. Therefore, the multiplier 66 provides a first aircraft direction cosine voltage proportional to the first direction cosine (cos $\beta$ cos$\alpha$). The output of the cosine generator 62 and the output of the sine generator 58 are connected to a multiplier 70 which is similar to the multiplier 66. The output of the multiplier 70 is connected to the input of an inverter 68 which provides a voltage equal in magnitude to, but of opposite polarity from, its input voltage. Therefore, the invertor 68 provides a third aircraft direction cosine voltage proportional to the third direction cosine ($-$sin $\beta$ cos $\alpha$).

Figure 8:
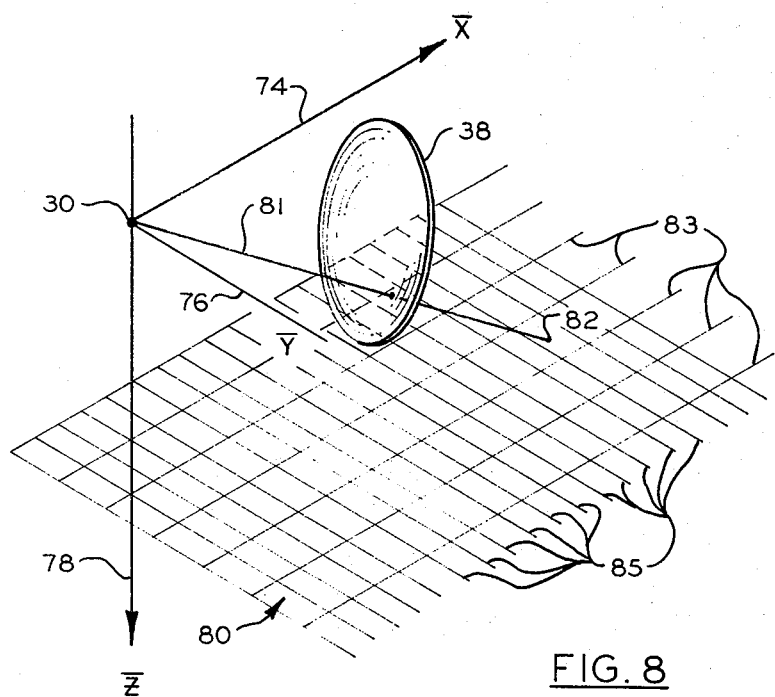
FIG. 8 is a view of a line of sight from the eyepoint to the synthetic terrain.

The aircraft direction cosine voltages generated by the reference direction cosine generator 52 are provided to a transformation generator 72 through signal lines 53, 55, 57. Voltages proportional to the simulated roll, pitch and heading of the aircraft (referred to as an attitude, hereinafter) are provided to the transformation generator 72 by the flight simulator computer 21 through signal lines 73. The transformation generator 72, which is comprised of components well known in the art, generates first, second and third earth direction cosine voltages in response to the voltages provided by the generator 52 and the computer 21. The earth direction cosine voltages are proportional to earth direction cosines which are in accordance with a well known transformation relationship which is given as:

$$\begin{bmatrix} I_{e1} \\ I_{e2} \\ I_{e3} \end{bmatrix} = \begin{bmatrix} \cos\Theta\cos\psi & \sin\phi\sin\Theta\cos\psi & \cos\phi\sin\Theta\cos\psi \\ & -\cos\phi\sin\psi & +\sin\phi\sin\psi \\ \cos\Theta\sin\psi & \sin\phi\sin\Theta\sin\psi & \cos\phi\sin\Theta\sin\psi \\ & +\cos\phi\cos\psi & +\sin\phi\cos\psi \\ -\sin\Theta & \sin\phi\cos\Theta & \cos\phi\cos\Theta \end{bmatrix} \begin{bmatrix} I_{b1} \\ I_{b2} \\ I_{b3} \end{bmatrix}$$

where $I_{e1}$, $I_{e2}$, $I_{e3}$ are first, second and third earth direction cosines, respectively:

$\psi$ = the heading angle of the simulated aircraft measured with respect to one group of grid lines;
$\Theta$ = the pitch angle of the simulated aircraft; and
$\phi$ = the roll angle of the simulated aircraft The earth direction cosines, the simulated altitude of the eyepoint above the synthetic terrain and the locations of the grid lines on the synthetic terrain are all elements of the null relationships referred to hereinbefore. In order to explain the null relationships, reference is now made to FIG. 8 where an earth coordinate system has axes 74 ($\overline{X}$), 76 ($\overline{Y}$), 78 ($\overline{Z}$). In this embodiment the earth direction cosine voltages are representative of three direction cosines along the axex 74 ($\overline{X}$), 76 ($\overline{Y}$), 78 ($\overline{Z}$), respectively.

A synthetic terrain 80 consists of north-south grid lines 83 and east-west grid lines 85 respectively parallel to the axes 74 ($\overline{X}$), 76 ($\overline{Y}$). It should be understood that the grid lines 83, 85 may be representative of grid lines in any of two orthogonal directions in the ground plane. The axis 78 (Z) is vertical with respect to the synthetic terrain 80 which is horizontal in this embodiment. In an embodiment where the ground plane is not always horizontal, the axis 78 ($\overline{Z}$) is not vertical with respect to the terrain. A line of sight 81 extends from the eyepoint 30 to a point 82 on the synthetic terrain 80, through the screen 38. According to the present invention, the point 82 is displayed in a desired perspective on the screen 38 when it is displayed at the point where the line 81 intersects the screen 38. As explained hereinafter, the terrain 80 is displayed on the screen 38 in the desired perspective.

Figure 9:
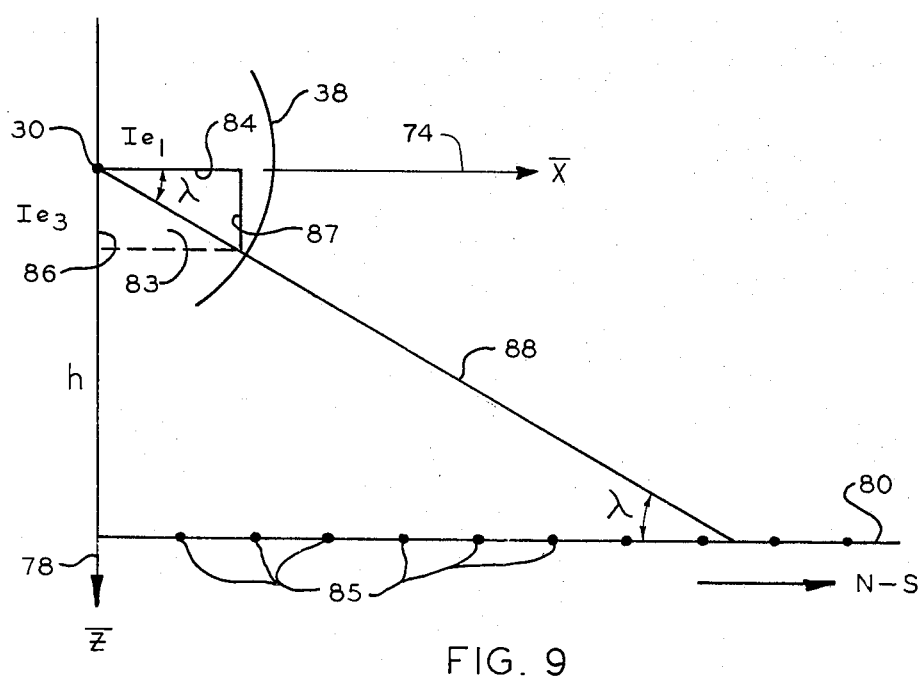
FIG. 9 is the view of FIG. 8 in the plane of the $\overline{X}\,\overline{Z}$ axes thereof.

Referring now to FIG. 9, the first earth direction cosine $I_{e1}$, along the axis 74 ($\overline{X}$), and the third earth direction cosine $I_{e3}$, along the axis 78 ($\overline{Z}$), are respectively represented by lines 84, 86. Construction lines 83, 87 are of the same respective lengths and respectively parallel to the lines 84, 86. A line projection 88 which passes through the intersection of the lines 83, 87 is representative of the projection of the line of sight 81 in the plane of the axes 74 ($\overline{X}$), 78 ($\overline{Z}$). Therefore, the line 88 intersects the grid lines 85 whenever the grid lines 85 are intersected by the line 81. The angle of the intersection of the line 88 and the terrain 80 is in accordance with a north-south tangent relationship which is given as:

$$\tan\lambda = \frac{I_{e3}}{I_{e1}} = \frac{h}{N-S}$$

where
$\lambda$ is the angle between the line 88 and the line 84 ($I_{e1}$);
$h$ is the height of the eyepoint 30 above the terrain 80; and
N-S is the distance from the axis 78 ($\overline{Z}$) to the intersection of the line 88 with the terrain 80, where the axis 78 ($\overline{Z}$) intersects a grid line 85.

From the north-south tangent relationship, a north-south null relationship may be provided which is only defined at the intersection of the line 88 with each of the lines 85. The north-south null relationship is given as:

$$\frac{I_{e3}}{I_{e1}} - \frac{h}{(N-S)_g} = 0$$

where $(N-S)_g$ is the distance from the axis 78 ($\overline{Z}$) to a grid line 85. Therefore, a null provided by the north-south null relationship is indicative of the intersection of the line 81 (FIG. 8) with one of the grid lines 85.

Figure 10:
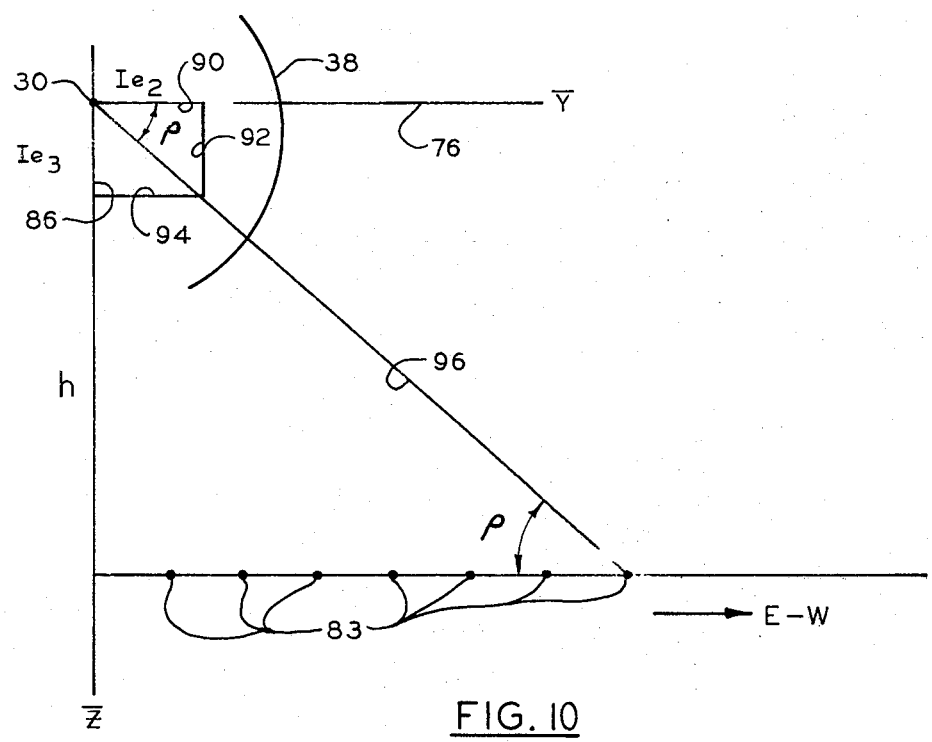
FIG. 10 is the view of FIG. 8 in the plane of the $\overline{Z}\,\overline{Y}$ axes thereof.

Referring now to FIG. 10, the second earth direction cosine $I_{e2}$, along the axis 76 ($\overline{Y}$), is represented by a line 90. Construction lines 92, 94 are of the same respective lengths and respectively parallel to the lines 86, 90. A line projection 96 which passes through the intersection of the lines 92, 94 is representative of the projection of the line of sight 81 in the plane of the axes 76

(Ȳ), 78 (Z̄). The angle of intersection of the line 96 and the terrain 80 is in accordance with an east-west tangent relationship which is given as:

$$\tan \rho = \frac{I_{e3}}{I_{e2}} = \frac{h}{E-W}$$

where
ρ is the angle between the line 96 and the line 90 ($I_{e2}$); and
E-W is the distance from the axis 78 (Z̄) to the intersection of the line 96 with the terrain 80, where the axis 78 (Z̄) intersects a grid line 83.

From the east-west tangent relationship an east-west null relationship may be provided which is only defined at the intersections of the line 96 with each of the lines 83. The east-west null relationship is given as:

$$\frac{I_{e3}}{I_{e3}} - \frac{h}{(E-W)_g} = 0$$

where $(E-W)_g$ is the distance from the axis 78 (Z̄) to a grid line 83.

Therefore, a null provided by the east-west null relationship is indicative of the intersection of the line 81 (FIG. 8) with one of the grid lines 83.

Figure 11:
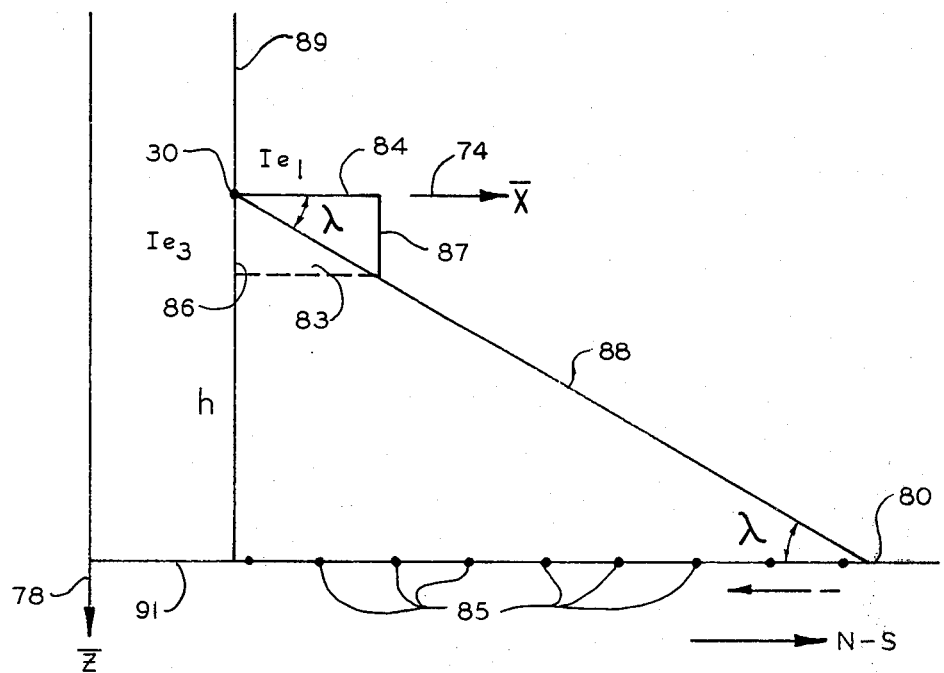
FIG. 11 is the view of FIG. 8 in the plane of the $\overline{X}\,\overline{Z}$ axes thereof where the eyepoint 30 has been translated.

In this embodiment, the simulated view of the terrain is made to change in accordance with a simulated translation of the aircraft. Referring now to FIG. 11, a local vertical axis 89 extends through the eyepoint 30 to the terrain 80. The axis 89 is parallel to the axis 78 (Z̄), a line 91 therebetween being representative of the simulated component of the translation of the aircraft along the axis 74 (X̄). Accordingly, the north-south tangent relationship may be modified to provide a relationship which is given as:

$$\tan \lambda = \frac{I_{e3}}{I_{e1}} = \frac{h}{(N-S) - \int \overset{\circ}{x} \, dt}$$

where
$\overset{\circ}{x}$ is the component of the simulated velocity of the aircraft along the axis 74 (X̄);
t is time; and
$\int \overset{\circ}{x} \, dt$ is the component of the simulated translation of the aircraft along the axis 74 (X̄).

Accordingly, a modified north-south null relationship may be provided which is given as:

$$\frac{I_{e3}}{I_{e1}} + \frac{h}{\int \overset{\circ}{x} \, dt} - \frac{h}{(N-S)_g} = 0$$

$$I_{e3} [(N-S)_g - \int \overset{\circ}{x} \, dt] - h\, I_{e1} = 0$$

and $I_{e3} (N-S)_g - [I_{e3} \int \overset{\circ}{x} \, dt + h\, I_{e1}] = 0$

To include the component of the simulated translation in the east-west direction, the east-west tangent relationship may be mofified (similar to the modification of the north-south tangent relationship) to provide a relationship which is given as:

$$\tan \rho = \frac{I_{e3}}{I_{e2}} = \frac{h}{(E-W) - \int \overset{\circ}{y} \, dt}$$

where $\overset{\circ}{y}$ is the component of the simulated velocity of the aircraft in the direction of the axis 76 (Ȳ).

Accordingly, a modified east-west null relationship may be provided which is given as:

$$\frac{I_{e3}}{I_{e2}} + \frac{h}{\int \overset{\circ}{y} \, dt} - \frac{h}{(E-W)_g} = 0$$

$$I_{e3} [(E-W)_g - \int \overset{\circ}{y} \, dt] - h\, I_{e2} = 0$$

and $I_{e3} (E-W)_g - [I_{e3} \int \overset{\circ}{y} \, dt + h\, I_{e2}] = 0$

According to the present invention, a video generator provides a video signal in response to the application of voltages representative of the modified null relationship indicating a null.

Accordingly, the first, second and third earth direction cosine voltages are provided to a video generator 98 (FIG. 7) through signal lines 99–101, respectively. An altitude voltage proportional to the height of the eyepoint 30 (FIGS. 8–11) above the terrain 80 is provided to the video generator 98 by the computer 21 (FIG. 8) through a signal line 102. Velocity component voltages proportional to the east-west and north-south components of velocity are provided to the video generator 98 by the computer 21 through signal lines 104, 106, respectively. As explained hereinafter, the video generator 98 provides a voltage indicative of nulls in accordance with the modified north-south and east-west null relationships.

Figure 12:
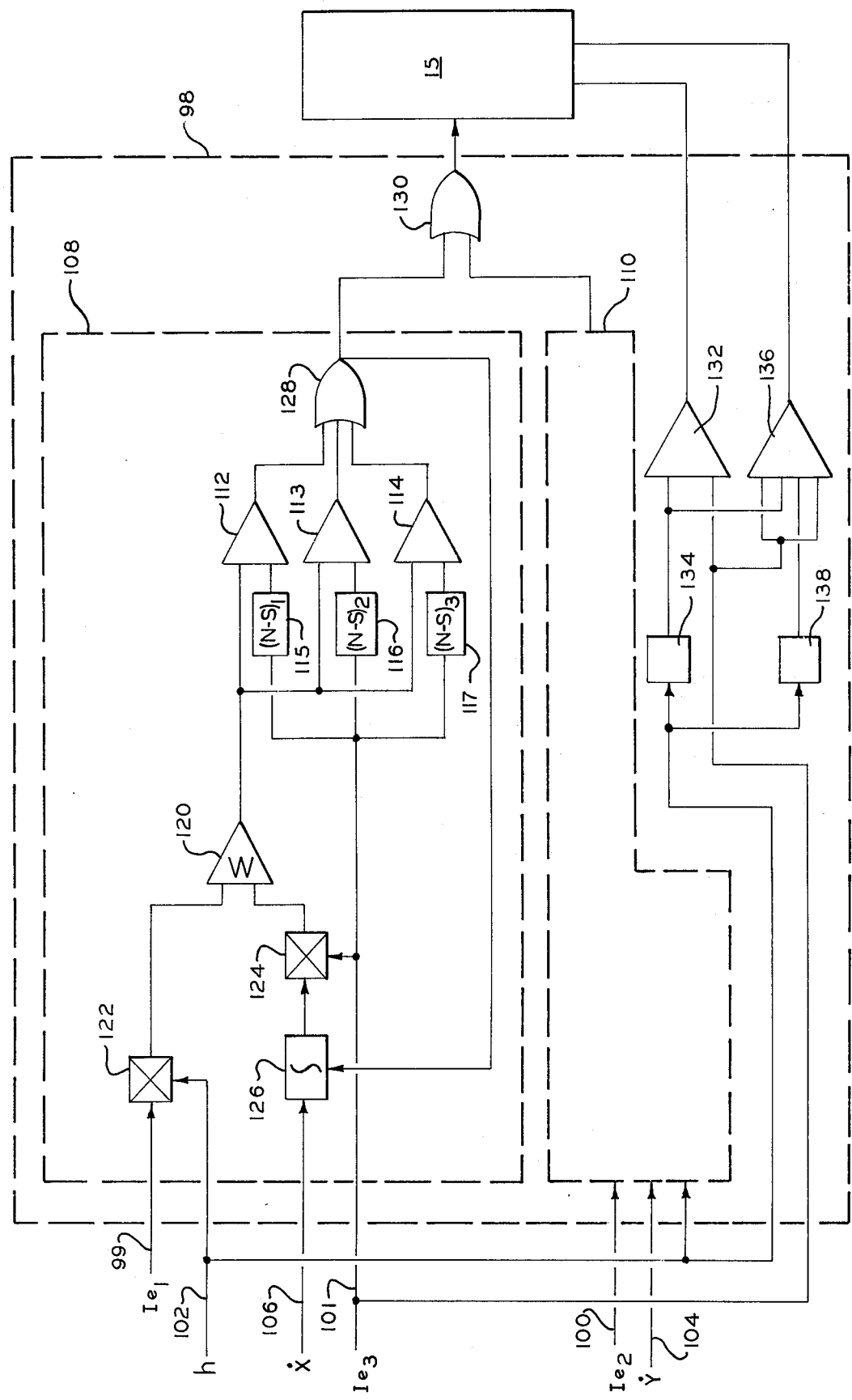
FIG. 12 is a schematic block diagram of a video generator which may be used in the preferred embodiment of FIG. 7.

The video generator 98 is used in a synthetic terrain generator which provides a synthetic terrain with three grid lines in the east-west direction and three grid lines in the north-south direction. Referring now to FIG. 12, the video generator 98 is comprised of a north-south video generator 108 and an east-west video generator 110.

In the generator 108, the line 101 is connected to one input of comparators 112–114 through attenuation networks 115–117, respectively. The attenuation networks each have a transmission in proportion to the displacement of three grid lines in the east-west direction which are equally spaced from the axis 78 (Z̄). Therefore, the networks 115–117 respectively provide voltages proportional to the term, $I_{e3}(N-S)_g$, for three east-west grid lines. The other inputs of the comparators 112–114 are all connected to the output of a summing amplifier 120 which provides an output voltage proportional to the term, $[I_{e3} \int \overset{\circ}{x} \, dt + h\, I_{e1}]$, as explained hereinafter. The comparators 112–114 are of the type which provide a negative voltage of approximately −7 volts (referred to as ONE hereinafter) in response to equal voltages applied at the inputs thereof; approximately −1.8 volts is provided (referred to as ZERO hereinafter) in response to unequal input voltages. Therefore, the comparators 112–114 respectively provide ONE in accordance with the modified north-south null relationship.

The amplifier 120 provides an output voltage proportional to the sum of the input voltages applied to the two inputs thereof. One input of the amplifier 120 is connected to the output of a multiplier 122 which is similar to the multiplier 66 (FIG. 7). The inputs of the multiplier 122 are connected to the lines 99, 102 whereby a voltage proportional to the term, $h\, I_{e1}$, is applied to one input of the amplifier 120. The other input of the amplifier 120 is connected to the output of a multiplier 124, similar to the multiplier 66 (FIG. 7). One input of the multiplier 124 is connected to the output of an integrator 126 which is of a type which provides a voltage proportional to the time integral of the voltage provided to an operational input thereof. The operational input of the integrator circuit 126 is connected to the line 106 whereby a voltage proportional to the term, $\int \dot{x}$ dt, is applied to the multiplier 124. The other input of the multiplier 124 is connected to the line 101 whereby a voltage proportional to the term, $I_{e3}$ $\int \dot{x}$ dt, is applied to the amplifier 120.

The outputs of the comparators 112–114 are respectively connected to the three inputs of an OR gate 128. The gate 128 provides ONE in response to ONE applied at any input thereof. The output of the gate 128 is connected to a reset input of the integrator 126 thereby providing a ONE thereto in response to ONE provided by comparators 112–114. In response to the application of ONE to the reset input, the output of the integrator is reset to provide zero volts. It should be understood that in the simulated translation, each successively encountered grid line is indistinguishable from a previously encountered grid line because of the equal spacing therebetween. Therefore, resetting of the integrator 126 in accordance with the north-south null relationship prevents a translation away from the grid lines represented by the networks 115–117.

The east-west generator 110, substantially identical to the generator 108, provides ONE in accordance with the modified east-west null relationship. All inputs of the generator 108 are connected to corresponding inputs of the generator 110 with the exception of the lines 104, 100 corresponding to lines 106, 99, respectively. The outputs of the generators 108, 110 are provided to the inputs of an OR gate 130. The output of the gate 130 is connected to the display 15. In response to ONE provided by either the generator 108 or the generator 110, ONE is provided by the gate 130. It should be understood that ONE is provided by the gate 130 in the form of a video pulse because the earth direction cosine voltages change at typical video rates.

In another aspect of the present invention, the display 15 provides a simulated view of the sky. A comparator 132, similar to the comparators 112–114, has one input connected to the line 101 ($I_{e3}$). The other input of the comparator 132 is connected to the line 102 through an attenuation network 134. The output of the comparator 132 is connected to the display 15. When the third earth direction cosine voltage is of the same polarity and has a magnitude which is greater than a first selected portion of the altitude voltage ($h$), the comparator 132 provides ONE. The provision of ONE by the comparator 132 which is a sky signal representative of the line of sight intersecting the sky. The output of the comparator 132 is connected to the display 15 which provides a first selected shade of grey on the screen 38 (FIG. 8) in response to the sky signal.

A simulated view of the horizon between the view of the grid lines and the view of the sky is also provided by the display 15. A dual comparator 136 (FIG. 12) has a first pair of inputs connected to the line 101 and a second pair of inputs respectively connected to line 102 through an attenuation network 138 and to the output of the network 134. When the third earth direction cosine voltage has a value intermediate to the values of the voltages provided by the networks 134, 138 the comparator 136 provides a ONE which is a horizon signal representative of the line of sight intersecting the horizon. The output of the comparator 136 is connected to the display 15 which provides a second selected shade of grey on the scan 38 (FIG. 8) in response to the horizon signal.

Thus there has been shown apparatus for providing the simulation of the view of the sky, the horizon and the terrain from an aircraft.

Having thus described a typical embodiment of our invention, that which we claim as new and desire to secure by Letters Patent of the United States is:

1. A method of simulating the view from an eyepoint in an aircraft of a grid pattern which is formed by grid lines on a synthetic terrain, said view being displayed on a viewing surface of a display unit of the type where a beam traces a raster on the viewing surface, comprising the steps of:
   providing an altitude signal representative of the height of said eyepoint above said terrain;
   providing attitude signals representative of the roll, pitch and heating of the aircraft;
   generating sweep signals representative of the location of said raster beam on said viewing surface;
   developing, from said attitude and sweep signals, earth direction cosine signals representative of a line of sight extending from said eyepoint through the location of said raster beam on said viewing surface to said synthetic terrain;
   generating a video pulse in response to said altitude signal, and said earth direction cosine signals concurrently having values in accordance with a null relationship which is representative of the intersection with a grid line of said line of sight; and
   displaying the location of said raster beam in response to said video pulse.

2. The method according to claim 1 further including the steps of:
   providing signals representative of the velocity of the aircraft;
   generating translation signals representative of the time integral of said velocity; and
   the video pulse being generated in accordance with a null relationship which includes a line of sight from an eyepoint having a translation represented by said translation signals.

3. A method of generating a synthetic terrain display for an aircraft comprising the steps of:
   raster scanning a viewing surface of blanked display means with a raster beam;
   defining a line pattern in a reference ground plane;
   locating an eyepoint in front of said viewing surface;
   defining a scanning line of sight which extends from the eyepoint through the instantaneous raster beam location on said viewing surface to said reference ground plane;
   electronically defining a predetermined relationship which indicates when said line of sight intersects the line pattern in said reference plane; and
   unblanking said display means to display the instantaneous raster beam location whenever said scanning line of sight intersects the line pattern in said reference plane, whereby a display of said line pattern in proper perspective is generated on said viewing surface.

4. The method of claim 3 wherein said raster scanning step comprises:

raster scanning a viewing surface of a blanked cathode ray tube with an electron beam; and said unblanking step comprises: unblanking said cathode ray tube.

5. The method of claim 3 wherein said step of electronically defining a predetermined relationship comprises:
electronically defining a null relationship which is satisfied only when said line of sight intersects said line pattern; and
detecting satisfaction of said null relationship and in response generating a signal to cause unblanking of said display means.

6. Apparatus for providing on a viewing surface of display means a simulatd view from an eyepoint in an aircraft or the like of a synthetic terrain having a plurality of grid lines, said display means having a beam which traces a raster on said viewing surface, the apparatus being designed to receive signals representative of the altitude and velocity of an aircraft, comprising:
means for generating earth direction cosine signals defining a line of sight from said eyepoint through the instantaneous beam location on said viewing surface to said synthetic terrain; and
video generator means responsive to said earth direction cosine signals and signals representative of the altitude and velocity of said aircraft for electronically defining a predetermined relationship which indicates when said line of sight intersects a grid line and providing a video pulse to said display means when said earth direction cosine, altitude and velocity signals concurrently have values in accordance with said predetermined relationship, to display the instantaneous raster beam location when the line of sight therethrough intersects a grid line on said synthetic terrain, whereby said displayed raster beam locations form said simulated view.

7. The apparatus of claim 5, wherein said means for generating earth direction cosine signals comprises:
means for generating sweep signals representative of the instantaneous location of said raster beam on said viewing surface;
means for generating aircraft direction cosine signals from said sweep signals, said aircraft direction cosine signals defining a line of sight between said eyepoint and said instantaneous raster beam location with respect to said aircraft; and
transformation means responsive to said aircraft direction cosine signals and signals representative of the attitude of said aircraft for generating earth direction cosine signals therefrom, said earth direction cosine signals defining said line of sight in an earth coordinate system.

8. The apparatus of claim 6 wherein said display means comprises a raster swept cathode ray tube.

9. The apparatus of claim 8, further including means to bias said cathode ray tube below cutoff and to unblank said cathode ray tube in response to a video pulse.

10. The apparatus of claim 1 wherein said display means is located in an aircraft simulator;
the signal representative of the altitude of said aircraft comprises a signal representative of the simulated height of said eyepoint above said synthetic terrain; and
the signal representative of the velocity of the aircraft comprises a signal representative of the simulated velocity of said aircraft.

11. The apparatus of claim 6 wherein said video generator means comprises means for electronically defining a pair of null relationships and for providing a video pulse to display said raster beam location when said altitude signal, said velocity signal and said earth direction cosine signals concurrently have values in accordance with one of said pair of null relationships.

12. The apparatus of claim 6 wherein one of said earth direction cosine signals is a vertical earth direction cosine signal, and said video generator means additionally comprises a comparator circuit which provides a sky signal when the vertical earth direction cosine signal has a value greater than the value of a selected portion of said altitude signal.

13. The apparatus of claim 6 wherein one of said earth direction cosine signals is a vertical earth direction cosine signal, and said video generator means additionally comprises a dual comparator circuit which provides a horizon signal when the vertical earth direction cosine signal has a value intermediate to the values of a pair of selected portions of said altitude signal.

14. The apparatus of claim 6 wherein said plurality of grid lines comprises a group of north-south lines and a group of east-west lines, said earth direction cosine signals are representative of earth direction cosines respectively along a vertical reference axis and axes parallel to said north-south and east-west grid lines, said video generator means comprising:
means for providing a north-south video pulse to display said raster beam location in response to said altitude signal, said earth direction cosine signals and said velocity signal concurrently having values in accordance with a north-south null relationship;
means for providing an east-west video pulse to display said raster beam location in response to said altitude signal, said earth direction cosine signals and said velocity signal concurrently having values in accordance with an east-west null relationship.

* * * * *

UNITED STATES PATENT OFFICE
CERTIFICATE OF CORRECTION

Patent No. 3,911,597      Dated October 14, 1975

Inventor(s) Maurice Millard et al

It is certified that error appears in the above-identified patent and that said Letters Patent are hereby corrected as shown below:

Col. 2, line 21, "inventin" should be --invention--.

Col. 3, line 1, after "displayed" add --on a--.

Col. 3, line 51, add period after "system" and capitalize "in" (second occurrence).

Col. 4, line 29, "$\beta$" should be --$\alpha$--.

Col. 7, line 50, first line of equation should be deleted in its entirety.

Col. 8, line 5, 1st line of equation should be deleted in its entirety.

Col. 8, line 52, " -- 7 volts" should be -- --.7 volts --.

Col. 12, line 48, after ";" add --and--.

Signed and Sealed this
*thirteenth* Day of *January 1976*

[SEAL]

Attest:

RUTH C. MASON
*Attesting Officer*

C. MARSHALL DANN
*Commissioner of Patents and Trademarks*